US012644717B2

(12) United States Patent
    Henkenhaf

(10) Patent No.:  US 12,644,717 B2
(45) Date of Patent:        Jun. 2, 2026

(54) METHOD FOR OUT PUTTING, IN A MOTOR VEHICLE, A NAVIGATION INSTRUCTION TO HEAD TOWARD A POSSIBLE STOPPING POINT AS WELL AS THE MOTOR VEHICLE AND A SERVER DEVICE

(71) Applicant: CARIAD SE, Wolfsburg (DE)

(72) Inventor:  Florian Henkenhaf, Ingolstadt (DE)

(73) Assignee: CARIAD SE, Wolfsburg (DE)

( * ) Notice:    Subject to any disclaimer, the term of this patent is extended or adjusted under 35 U.S.C. 154(b) by 149 days.

(21) Appl. No.: 18/352,901

(22) Filed:    Jul. 14, 2023

(65)            Prior Publication Data

US 2024/0019258 A1      Jan. 18, 2024

(30)        Foreign Application Priority Data

Jul. 15, 2022    (DE) .......................... 102022117732.7

(51) Int. Cl.
    *G01C 21/34*        (2006.01)
    *G01C 21/00*        (2006.01)
    *G01C 21/36*        (2006.01)
(52) U.S. Cl.
    CPC ..... *G01C 21/3461* (2013.01); *G01C 21/3629* (2013.01); *G01C 21/3852* (2020.08)
(58) Field of Classification Search
    CPC ............ G01C 21/3461; G01C 21/3629; G01C 21/3852
    See application file for complete search history.

(56)            References Cited

U.S. PATENT DOCUMENTS

| | | | | |
|---|---|---|---|---|
| 2014/0132767 | A1* | 5/2014 | Sonnabend | ............ G06V 20/63 |
| | | | | 348/148 |
| 2018/0209812 | A1* | 7/2018 | MacGougan | ...... G01C 21/3697 |
| 2019/0390964 | A1* | 12/2019 | Lyu | ...................... G01C 21/265 |
| 2021/0264151 | A1 | 8/2021 | Soni | |
| 2022/0034664 | A1 | 2/2022 | Vukich et al. | |
| 2022/0170760 | A1 | 6/2022 | Bennati | |

FOREIGN PATENT DOCUMENTS

| | | |
|---|---|---|
| DE | 102012008090 A | 10/2013 |
| DE | 102019215522 A | 4/2021 |
| DE | 102019135409 A | 6/2021 |

* cited by examiner

*Primary Examiner* — Anshul Sood
*Assistant Examiner* — Joshua Jeffrey Penko
(74) *Attorney, Agent, or Firm* — Seed Intellectual Property Law Group LLP

(57)            ABSTRACT

The disclosure relates to a method for outputting a navigation instruction in a motor vehicle to head toward a possible stopping point, wherein a navigation system of the motor vehicle determines a current speed of the motor vehicle and at least one topology parameter in a predetermined vicinity of a previously determined possible stopping point and determines a time at which the outputting of the navigation instruction to the user to head toward the possible stopping point should occur, at least in dependence on the determined current speed and the at least one determined topology parameter. At the determined time, the navigation system outputs the navigation instruction to the user to head toward the possible stopping point. The disclosure furthermore relates to a server device that provides electronic map data to a navigation system of a motor vehicle in order to carry out such a method.

9 Claims, 3 Drawing Sheets

METHOD FOR OUT PUTTING, IN A MOTOR VEHICLE, A NAVIGATION INSTRUCTION TO HEAD TOWARD A POSSIBLE STOPPING POINT AS WELL AS THE MOTOR VEHICLE AND A SERVER DEVICE

BACKGROUND

Technical Field

The present disclosure relates to a method for outputting, in a motor vehicle, a navigation instruction to head toward a possible stopping point. The method includes: a) providing, in the motor vehicle, a navigation system having electronic map data in which a plurality of possible stopping points for motor vehicles is registered; b) receiving, by the navigation system, a route; c) generating, by the navigation system, navigation instructions for driving along the route based on the electronic map data and the route; outputting the navigation instructions; d) receiving, by the navigation system, a possible stopping point query; e) determining, by the navigation system, the possible stopping point on the route based on the electronic map data and the possible stopping point query. The disclosure furthermore relates to a motor vehicle that performs such a method as well as a server device for providing electronic map data to a navigation system of a motor vehicle in order to carry out such a method.

DESCRIPTION OF THE RELATED ART

Navigation systems are known in the prior art, where possible stopping points are registered in their electronic map material, such as parking lots or road junctions. The parking lots may belong, for example, to rest stops, prospect points, and the like, being also registered and characterized as such in the electronic map material.

Sign postings are helpful in finding such possible stopping points, but they are not always present. When using electronic map material, it may happen that the user is prompted about the possible stopping point too late to arrive at the possible stopping point without hindering the current traffic.

Especially when the possible stopping point is not easy to recognize, the user must pay attention to the surroundings and reduce his speed for this, thereby possibly hindering the actual traffic.

BRIEF SUMMARY

Embodiments of the disclosure improve traffic safety when driving toward a possible stopping point by way of a method as mentioned above. Furthermore, a corresponding motor vehicle should be provided to carry out such a method. Finally, embodiments of the disclosure create a server device for providing of electronic map material to a navigation system of a motor vehicle in order to carry out such a method.

The present disclosure is based on the discovery that problems when heading toward possible stopping points in the prior art are due to the fact that these are hard to identify, and therefore often too late, given the current speed of the motor vehicle and at least one topology parameter in a predetermined vicinity of the determined possible stopping point. The at least one topology parameter here relates in particular to altitude differences between the motor vehicle on the route at the time of the query and the possible stopping point and/or at least one curviness parameter of the route between the position of the motor vehicle at the time of the query and the possible stopping point. In other words, if the motor vehicle is traveling in hilly terrain in which the route is furthermore winding, it may be difficult to recognize a possible stopping point, which is pointed out too late, and often it can only be approached by affecting the current traffic. Namely, if the user has to reduce the speed of his motor vehicle, this will appear to be unnecessary to the following traffic, thus encountering little acceptance. Especially if the following traffic does not respond in time to a sudden stop, there is a risk of rear-end collisions.

In this regard, it is therefore especially advantageous for the navigation instruction to contain an indication depending on the at least one topology parameter, for example, "possible stopping point involves a road junction after the second next right hand curve" or "possible stopping point hard to see after the next mountain top" or "possible stopping point after the tunnel." The navigation instruction can be expanded to output a warning signal, from which the user can conclude that the possible stopping point which is to be driven toward is located in a complex landscape and is therefore difficult to reach.

The method according to the disclosure therefore includes, as compared to the method mentioned above f) determining, by the navigation system, a current speed of the motor vehicle and at least one topology parameter in a predetermined vicinity of the determined possible stopping point; g) determining, by the navigation system, a time at which the outputting of the navigation instruction to the user to head toward the possible stopping point will occur, at least in dependence on the determined current speed and the at least one determined topology parameter; and h) outputting, by the navigation system, the navigation instruction to the user to head toward the possible stopping point at the determined time. The procedure according to the disclosure ensures that the user is made aware even of hard to approach possible stopping points in good time, so that the user can head toward them for the most part without affecting the other traffic. According to the mentioned advantageous modifications of the method according to the disclosure, the approaching of possible stopping points which are hard to see is further improved.

According to the disclosure, a possible stopping point borders directly on a respective road of the route and has a surface which is adequate for parking the motor vehicle, especially the specific motor vehicle by way of which the method according to the disclosure is being carried out. "Borders directly on a route of the road" means that a motor vehicle which leaves the route upon heading toward a possible stopping point is already partly at the possible stopping point at the moment when it leaves the route.

The possible stopping points which are used are in particular road junctions, areas designated as parking lots, and layovers. The method according to the disclosure can be used is especially advantageously in connection with driving toward layovers as possible stopping points, since layovers are often not posted with signs—as opposed to road junctions and parking lots—and thus they are especially difficult to approach. Although such layovers can be identified with the aid of satellite images, this option is very hard to use when driving the motor vehicle, since every glance at a corresponding map indicated on a display device of the motor vehicle is a glance away from the actual traffic situation.

Especially when traveling on unfamiliar, winding roads, for example in the mountains, with limited forward view, it may thus be difficult to stop at layovers without the procedure according to the disclosure. If these layovers on a route are unfamiliar, they may quickly appear, so that they cannot be used for stopping. On the other hand, an early recognition in dependence on the current speed of the motor vehicle and the at least one determined topology parameter makes it possible to reach even layovers not indicated by traffic signs located on the route.

Preferably, the outputting of the navigation instruction to head toward the possible stopping point is done by an indication on a display device of the motor vehicle and/or by outputting an acoustic signal through a loudspeaker device of the motor vehicle.

For application cases or application situations which may emerge during the method and which are not explicitly described here, it can be provided according to the method to output an error message and/or a prompt to enter user feedback and/or a standard setting and/or a predetermined initial state can be established.

The disclosure furthermore relates to a motor vehicle designed to carry out a method according to the disclosure. The disclosure furthermore relates to a server device for providing electronic map material to a navigation system of a motor vehicle in order to carry out a method according to the disclosure.

The disclosure also includes modifications of the motor vehicle according to the disclosure and the server device according to the disclosure which have features as already described in connection with the modifications of the method according to the disclosure. For this reason, the corresponding modifications of the motor vehicle according to the disclosure and the server device according to the disclosure will not be further described here.

The motor vehicle according to the disclosure is preferably configured as an automobile, especially a passenger car or a truck, or as a personal bus or motorcycle.

An especially advantageous embodiment of the server device according to the disclosure is designed to train an AI (artificial intelligence) system, in order to find possible stopping points for a motor vehicle in optical satellite images. The server device is furthermore designed to check whether a parking lot or a road junction is already registered at a particular possible stopping point which has been found in the electronic map material, whereupon the server device if the check is negative characterizes the location of the possible stopping point found in the electronic map material as a layover. In this way, the electronic map material can be expanded with the category of "layovers."

Mechanisms for creation of maps based on artificial intelligence are sufficiently well known. For example, in this regard, reference is made to US 2021/0264151 A1 as well as DE 10 2019 215 522 A1. US 2021/0264151 A1 relates to a device and a method for recognizing of traffic lane features from an image according to a given travel geometry. An image with at least one path is received. The image may be an aerial photograph. Map data corresponding to the at least one path and defining the given path geometry are selected. The image is modified in accordance with the selected map data including the given path geometry. A model for prediction of traffic lane features is created or configured on the basis of the modified image. A subsequent image is provided to the model for prediction of traffic lane features in order to predict at least one traffic lane feature.

DE 10 2019 215 522 A1 relates to a method for updating of attributes in at least one digital map by a controller, wherein a digital map of a region divided into a number of segments is received, at least one aerial image and/or satellite image of the region is received, the at least one aerial image and/or satellite image of the region is divided into a number of segments which are geometrically congruent with the map segments of the digital map, the segments of the at least one aerial image and/or satellite image are furnished in the form of an input to at least one neural network and evaluated by the at least one neural network in order to determine attributes in the respective segments, and the attributes determined by the neural network are memorized in order to update or supplement the attributes already saved in the digital map. The attributes pertain to the number of traffic lanes or the traffic lane width.

An advantageous modification of the server device is characterized in that the server device is furthermore designed to determine at least one topology parameter in the vicinity of the particular layover and to save it in combination with the respective layover. Preferably, this involves the already mentioned topology parameters which are relevant in heading toward a respective layover. Accordingly, if a navigation system establishes a route to head toward a determined layover and outputs this to the user, the navigation system at the same time can evaluate the topology parameters saved in combination with the respective layover, in order to convert them (cf. above) when necessary into a corresponding output to the user. In this way, even layovers not registered in electronic navigation material of the prior art and usually not having any sign postings in the road traffic can also be reached safely as possible stopping points and without affecting the current traffic.

The disclosure also encompasses the combinations of the features of the described embodiments. Thus, the disclosure also encompasses realizations having a combination of the features of several of the described embodiments, as long as the embodiments were not described as being mutually exclusive.

BRIEF DESCRIPTION OF THE SEVERAL VIEWS OF THE DRAWINGS

In the following, exemplary embodiments of the disclosure will be described.

DETAILED DESCRIPTION

The following exemplary embodiments are explained. In the exemplary embodiments, the components described for the embodiments each time represent individual features of the disclosure, to be considered independently of each other, and also modifying the disclosure independently of each other. Therefore, the disclosure will also encompass other than the represented combinations of features. Furthermore, the described embodiments can also be supplemented with other of the already described features of the disclosure.

In the figures, the same reference numbers each time designate functionally identical elements.

Figure 1:
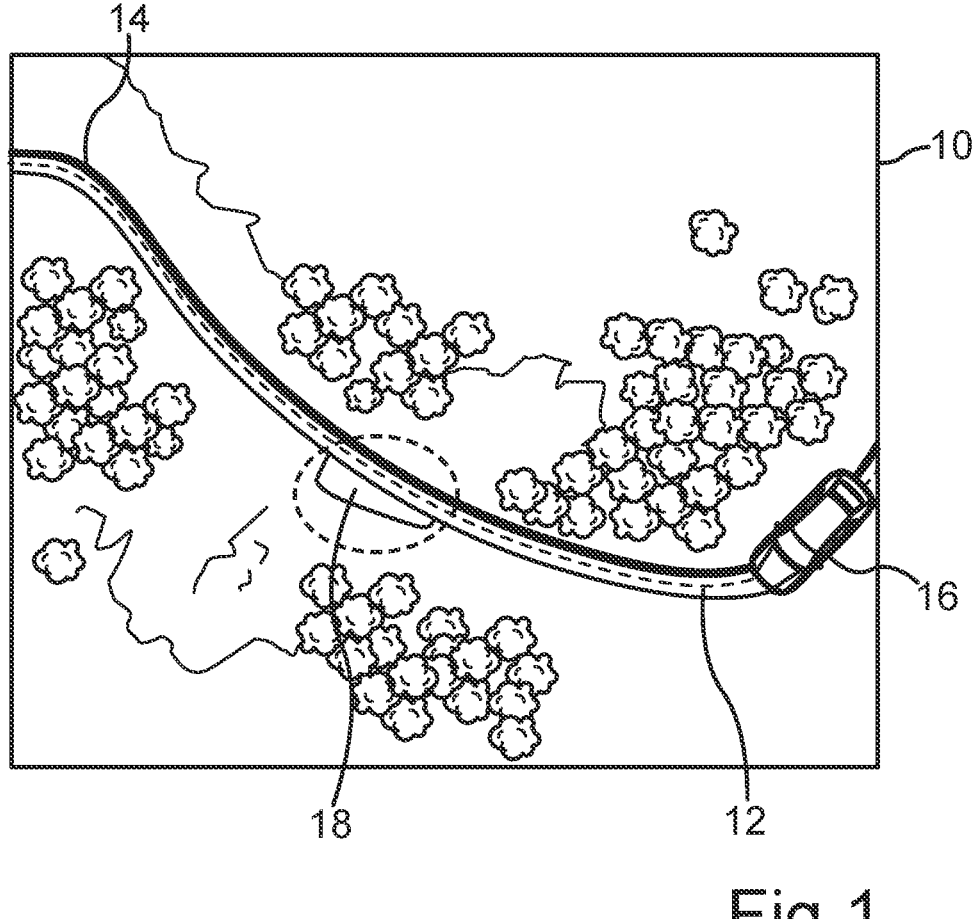
FIG. 1 shows a schematic representation to explain the issues when approaching a hard to recognize layover by a motor vehicle.

FIG. 1 shows in schematic representation a satellite image 10 having a road 12, along which a route 14 of a motor vehicle 16 runs, which a user has established by way of a navigation system in the motor vehicle. In one or more implementations, the navigation system includes at least one processor and at least one memory storing instructions that, when executed by the at least one processor, cause the at least one processor to perform the acts of the navigation system described herein. In the motor vehicle 16, the user has now entered into the navigation system a query as to a possible stopping point. The next possible stopping point is a layover 18, but this lies on the route 14 immediately after a sharp right hand turn. This possible stopping point 18 would only be recognized too late by the user of the motor vehicle 16, which can result in abrupt braking maneuvers, so that the current traffic might be jeopardized.

Figure 2:
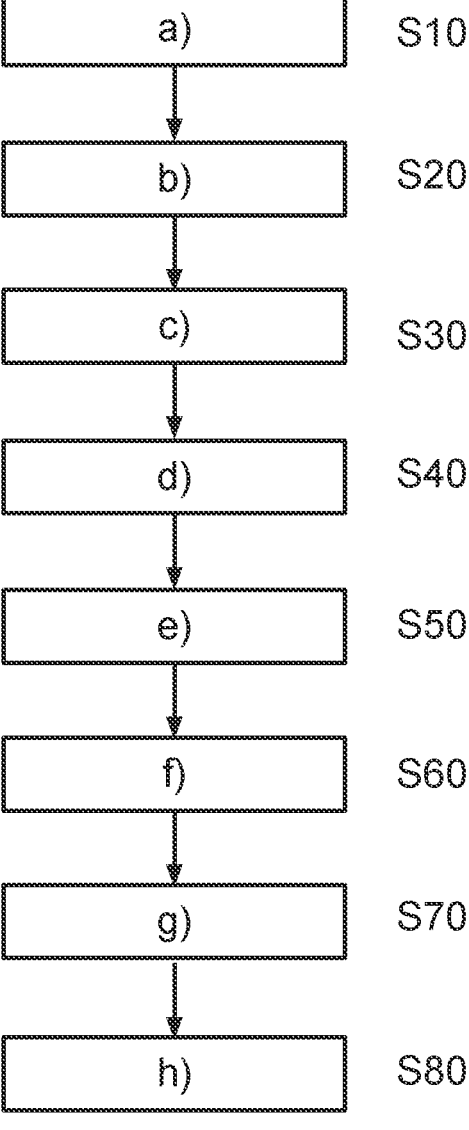
FIG. 2 shows a signal flow chart for an exemplary embodiment of the method according to the disclosure.

This can be avoided by an exemplary embodiment of a method according to the disclosure, the corresponding signal flow chart of which is presented in FIG. 2. According to step S10, a navigation system with electronic map material (e.g., data) is provided in the motor vehicle 16, in which possible stopping points 18 for motor vehicles 16 have been registered. According to step S20, the user enters a route 14 into the navigation system. According to step S30, the navigation system generates, in dependence on the electronic map material and the route 14 that was entered, navigation instructions for driving along the route 14 and puts these out to the user. According to step S40, the user enters a query as to a possible stopping point 18 in the navigation system. In step S50, the navigation system determines from the electronic map material at least one possible stopping point 18 on the route 14. In step S60, the navigation system further determines the current speed of the motor vehicle 16 and at least one topology parameter in a given vicinity of the determined possible stopping point 18. In step S70, the navigation system determines a time at which the navigation instruction for reaching the possible stopping point 18 is output to the user, at least in dependence on the determined current speed and the at least one determined topology parameter. Finally, the navigation system in step S80 outputs to the user at the determined time the navigation instruction for reaching the possible stopping point 18.

Figure 3:
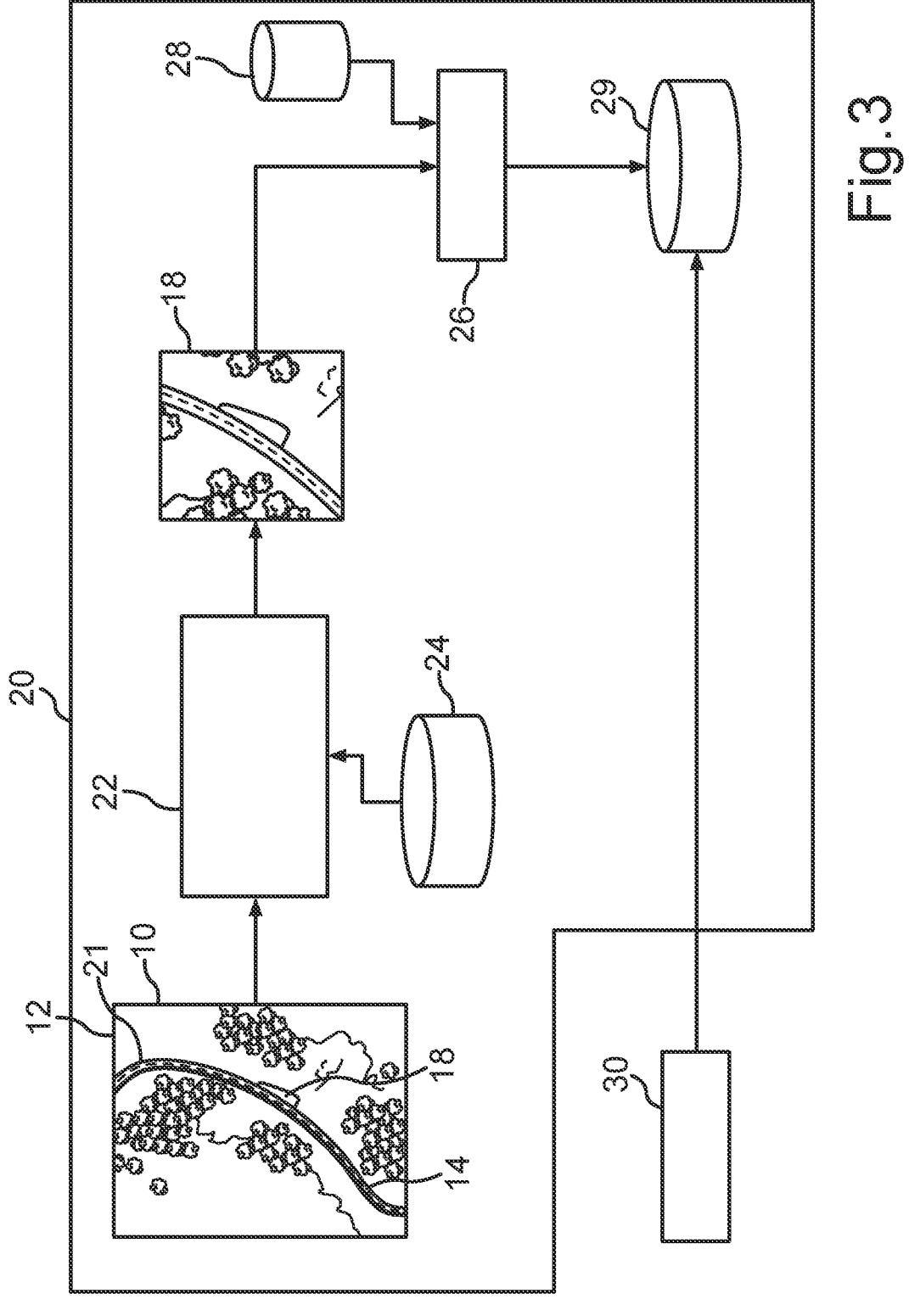
FIG. 3 shows a schematic representation to explain an exemplary embodiment of a server device according to the disclosure.

FIG. 3 shows in schematic representation an exemplary embodiment of a server device 20 according to the disclosure for providing of electronic map material to a navigation system of a motor vehicle 16 in order to carry out a method according to the disclosure. In one or more implementations, the server device 20 includes at least one processor and at least one memory storing instructions that, when executed by the at least one processor, cause the at least one processor to perform the acts of the server device 20 described herein Accordingly, this comprises an AI (artificial intelligence) system 22 for finding possible stopping points for a motor vehicle 16 in optical satellite images 10. For example, a satellite image 10 is shown, with a sample route 14 along a road 12. As an example of a topology parameter, there is shown a curve 21, determining the curve radius of the curve 21 as a curviness parameter. Further, a layover 18 can be recognized in the satellite image 10. By way of the AI system 22, which can be based on a neural network, the layover 18 is detected and its coordinates are calculated. Since the satellite images 10 are two-dimensional views, further topology data are furnished to the AI system 22 from a topology memory 24, involving three-dimensional aspects in order to determine hills, mountains, valleys and the like, which may be relevant in regard to a particular detected layover relevant. On the other hand, the curviness of a road 12 can be readily determined from the two-dimensional satellite image 10.

In a validation device 26, a check is made as to whether a parking lot or a road junction is already registered in the electronic map material at a respective possible stopping point which has been found, and if the check is negative then the server device will describe the possible stopping point found in the electronic map material as a layover 18. For this purpose, the coordinates of parking lots or road junctions already registered as such and saved in a storage device 28 will be provided to the validation device 26.

A validated layover 18 is then characterized by an ID number, together with its coordinates, that is, longitude, latitude, and altitude, as well as reference information about the surrounding topology, and saved in a storage device 29. The memory contents can then be fused with traditional electronic map material in which no layovers have been described until now, so as to obtain in this way electronic map material which now also contains layovers as well as information about the surrounding topology. The storage device 29 can comprise an interface 30 for manual input.

Accordingly, if the coordinates of a layover 18 so memorized are retrieved, at the same time the relevant topology in terms of heading toward the layover can be determined and evaluated, so that a corresponding output to the user can be generated.

German patent application no. 102022117732.7, filed Jul. 15, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents

The invention claimed is:

1. A method for outputting, in a motor vehicle, a navigation instruction to head toward a possible stopping point, the method comprising:

providing, in the motor vehicle, a navigation system having electronic map data in which a plurality of possible stopping points for motor vehicles is registered;

receiving, by the navigation system, a route;

generating, by the navigation system, navigation instructions for driving along the route based on the electronic map data and the route;

outputting the navigation instructions;

receiving, by the navigation system, a possible stopping point query;

determining, by the navigation system, the possible stopping point on the route based on the electronic map data and the possible stopping point query;

determining, by the navigation system, a current speed of the motor vehicle and topology parameters in a predetermined vicinity of the possible stopping point, wherein the topology parameters involve an altitude difference between an altitude of the motor vehicle on the route at a time of the possible stopping point query and an altitude of the possible stopping point, and a curviness parameter of the route between a position of the motor vehicle at the time of the possible stopping point query and the possible stopping point;

determining, by the navigation system, a time at which outputting of the navigation instruction to head toward the possible stopping point will occur based on the current speed and the topology parameters; and outputting, by the navigation system, on a display device of the motor vehicle, the navigation instruction to head toward the possible stopping point at the time.

2. The method according to claim 1, wherein each of the possible stopping points directly borders a road of the route and has a surface for parking the motor vehicle.

3. The method according to claim 1, wherein the possible stopping points include road junctions, areas designated as parking lots, and layovers.

4. The method according to claim 1, wherein the outputting of the navigation instruction to head toward the possible stopping point is done by displaying an indication on a display device of the motor vehicle or by outputting an acoustic signal through a loudspeaker device of the motor vehicle.

5. The method according to claim 1, wherein the navigation instruction contains an indication that is based on the topology parameters.

6. A motor vehicle comprising:

a navigation system including:

at least one processor; and at least one memory storing electronic map data in which a plurality of possible stopping points for motor vehicles is registered, and instructions that, when executed by the at least one processor, cause the at least one processor to:

receive a route;

generate navigation instructions for driving along the route based on the electronic map data and the route;

output the navigation instructions;

receive a possible stopping point query;

determine a possible stopping point on the route based on the electronic map data and the possible stopping point query;

determine a current speed of the motor vehicle and topology parameters in a predetermined vicinity of the possible stopping point, wherein the topology parameters involve an altitude difference between an altitude of the motor vehicle on the route at a time of the possible stopping point query and an altitude of the possible stopping point, and a curviness parameter of the route between a position of the motor vehicle at the time of the possible stopping point query and the possible stopping point;

determine a time at which outputting of the navigation instruction to head toward the possible stopping point will occur based on the current speed and the topology parameters; and output, on a display device of the motor vehicle, the navigation instruction to head toward the possible stopping point at the time.

7. A server device for providing electronic map data to a navigation system of a motor vehicle, the server device comprising:

at least one processor; and at least one memory storing instructions that, when executed by the at least one processor, cause the at least one processor to:

receive at least one optical satellite image;

receive topology data;

register a plurality of possible stopping points for motor vehicles in electronic map data based on the at least one optical satellite image and the topology data, wherein, for each possible stopping point of the possible stopping points, the electronic map data includes an identification number of the stopping point, coordinates indicating longitude, latitude, and altitude of the stopping point, and information about a surrounding topology of the stopping point, wherein the information about the surrounding topology of at least one of the possible stopping points includes a curve radius of a curve on a route that includes the at least one of the possible stopping points determined based on the at least one optical satellite image; and provide the electronic map data to the navigation system of the motor vehicle.

8. The server device according to claim 7, wherein the instructions, when executed by the at least one processor, cause the at least one processor to:

train an artificial intelligence system to find the possible stopping points for motor vehicles in optical satellite images;

determine whether a parking lot or a road junction is already registered at a particular one of the possible stopping points in the electronic map data; and if the parking lot or the road junction is not already registered at the particular one of the possible stopping points, characterize a location of the particular one of the possible stopping points as a layover.

9. The server device according to claim 8, wherein the instructions, when executed by the at least one processor, cause the at least one processor to:

determine at least one topology parameter in a vicinity of the layover; and save the at least one topology parameter in combination with the layover.

* * * * *